United States Patent
Kang

(10) Patent No.: US 11,054,880 B2
(45) Date of Patent: Jul. 6, 2021

(54) DISPLAY APPARATUS FOR SUPPLYING POWER TO EXTERNAL APPARATUS, METHOD THEREOF, AND COMPUTER-READABLE MEDIUM

(71) Applicant: SAMSUNG ELECTRONICS CO., LTD., Suwon-si (KR)

(72) Inventor: Jeongil Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/273,372

(22) Filed: Feb. 12, 2019

(65) Prior Publication Data

US 2019/0250692 A1 Aug. 15, 2019

(30) Foreign Application Priority Data

Feb. 12, 2018 (KR) .......................... 10-2018-0016973

(51) Int. Cl.
*G06F 1/3218* (2019.01)

(52) U.S. Cl.
CPC ..... *G06F 1/3218* (2013.01); *G09G 2330/021* (2013.01)

(58) Field of Classification Search
CPC ............... G09G 1/005; G09G 2330/00; G09G 2330/02; G09G 2330/021; G06F 1/3203; G06F 1/3206; G06F 1/3212; G06F 1/3215; G06F 1/3218; G06F 1/3265; G06F 1/3284; G06F 1/325; G06F 1/3262; G06F 1/266; G06F 1/26; G06F 1/263; G06F 1/3296; G06F 1/3234; G06F 1/329; G06F 13/00; G06F 1/3209; H02J 1/04; H02J 5/00; H02J 7/00; H02J 7/007; Y02D 10/153; Y02D 10/15; Y02B 10/15; Y02B 10/153
See application file for complete search history.

(56) References Cited

U.S. PATENT DOCUMENTS

| | | | |
|---|---|---|---|
| 9,093,856 | B2 | 7/2015 | Han et al. |
| 9,215,401 | B2 | 12/2015 | Liu et al. |
| 9,553,451 | B2 | 1/2017 | Zacharchuk et al. |

(Continued)

FOREIGN PATENT DOCUMENTS

| | | |
|---|---|---|
| CN | 204336309 U | 5/2015 |
| EP | 2177969 A2 | 4/2010 |

(Continued)

OTHER PUBLICATIONS

International Search Report (PCT/ISA/210) dated May 1, 2019 issued by the International Searching Authority in International Application No. PCT/KR2019/001676.

(Continued)

*Primary Examiner* — Nitin Patel
*Assistant Examiner* — Amen W. Bogale
(74) *Attorney, Agent, or Firm* — Sughrue Mion, PLLC

(57) ABSTRACT

Disclosed is a display apparatus. The display apparatus includes a display, a power supply configured to supply power to the display, a port, and a controller configured to control the power supply to supply power to an external apparatus through the port based on the external apparatus being connected to the port and control the power supply to adjust an amount of power supplied to the display based on a power supply characteristic of the port.

15 Claims, 10 Drawing Sheets

(56) References Cited

U.S. PATENT DOCUMENTS

| | | | |
|---|---|---|---|
| 2007/0257654 A1 | 11/2007 | Krajcovic et al. | |
| 2013/0275779 A1* | 10/2013 | He | G06F 1/266 |
| | | | 713/300 |
| 2013/0305064 A1* | 11/2013 | Fossati | G06F 1/266 |
| | | | 713/300 |
| 2014/0223207 A1* | 8/2014 | Du | G06F 1/3215 |
| | | | 713/320 |
| 2015/0029397 A1 | 1/2015 | Leabman et al. | |
| 2016/0072377 A1 | 3/2016 | Oh et al. | |
| 2016/0239062 A1 | 8/2016 | Lee | |
| 2016/0306408 A1* | 10/2016 | Du | G06F 1/3234 |
| 2017/0273202 A1 | 9/2017 | Joo et al. | |
| 2018/0284865 A1* | 10/2018 | Shimamura | G06F 3/1279 |
| 2020/0089296 A1* | 3/2020 | Fossati | G06F 1/266 |

FOREIGN PATENT DOCUMENTS

| | | |
|---|---|---|
| EP | 2650752 A2 | 10/2013 |
| JP | 2006-227700 A | 8/2006 |
| KR | 10-2008-0064657 A | 7/2008 |
| WO | 2011/046645 A1 | 4/2011 |
| WO | 2013006591 A1 | 1/2013 |

OTHER PUBLICATIONS

Written Opinion (PCT/ISA/237) dated May 1, 2019 issued by the International Searching Authority in International Application No. PCT/KR2019/001676.

Communication dated Nov. 19, 2020 issued by the European Patent Office in application No. 19750579.5.

* cited by examiner

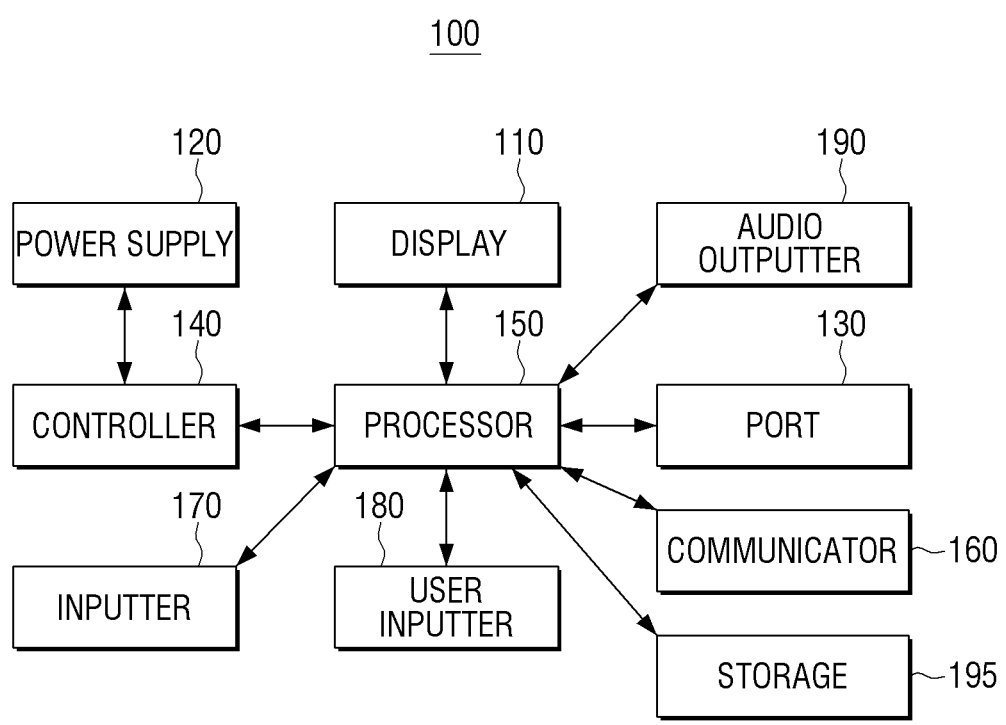

DISPLAY APPARATUS FOR SUPPLYING POWER TO EXTERNAL APPARATUS, METHOD THEREOF, AND COMPUTER-READABLE MEDIUM

CROSS-REFERENCE TO RELATED APPLICATION

This application is based on and claims priority under 35 U.S.C. § 119 to Korean Patent Application number 10-2018-0016973, filed on Feb. 12, 2018, in the Korean Intellectual Property Office, and the disclosure of which is incorporated by reference herein in its entirety.

BACKGROUND

Field

Apparatuses and methods consistent with embodiments relate to technology for supplying and controlling power of a display apparatus.

Description of Related Art

While a convenient function of a display apparatus such as a TV or a monitor continues to develop, the demand for a function of supplying power to an external apparatus through the display apparatus has increased.

However, in general, connecting the external apparatus to the display apparatus through a port such as a USB terminal is mostly for the purpose of transmitting and receiving data related to images and sound between the display apparatus and the external apparatus, and the power supply from the display apparatus to the external apparatus is often a secondary purpose or function of the port.

Accordingly, when a power capacity of a display apparatus is not sufficient, it may be difficult to supply power to the external apparatus. Thus, it is desirable to supply power to the external apparatus requiring a large amount of power consumption without increasing power capacity of the display apparatus itself.

SUMMARY

According to an aspect of the disclosure, a display apparatus includes a display, a power supply configured to supply power to the display, a port and a controller configured to, based on an external apparatus being connected to the port, control the power supply to supply power to the external apparatus through the port and adjust an amount of power supplied to the display based on a power supply characteristic of the port.

The controller may control the power supply to reduce an amount of current that is applied to a backlight unit in the display based on a maximum power value that is outputtable through the port.

The controller may, based on a maximum power value outputtable thorough the port, measure an actual power consumption value of the external apparatus and control the power supply to readjust the amount of power supplied to the display based on the measured actual power consumption value of the external apparatus.

The controller may control the power supply to readjust the amount of power supplied to the display to a value obtained by subtracting the measured actual power consumption value from a sum of the adjusted power value and the maximum power value.

The controller may control the power supply to receive power usage information of the external apparatus through the port and readjust the amount of power supplied to the display based on the received power usage information.

The received power usage information may include a power consumption value of the external apparatus, and the controller may, based on a power consumption value of the external apparatus being greater than the maximum power value outputtable to the external apparatus through the port, control the power supply not to supply power to the external apparatus through the port and indicate that the power supply is not available.

The controller may monitor a change in a power consumption value of the external apparatus by periodically receiving the power usage information of the external apparatus through the port and control the power supply to readjust the amount of power that is supplied to the display according to the change of the power consumption value.

The display apparatus may further include a communicator, and the controller may receive power usage information of the external apparatus through the communicator and control the power supply to readjust the amount of power that is supplied to the display based on the received power usage information.

The controller may, based on the port being connected to the external apparatus, control the display to display a message to enter a power supply mode with respect to the external apparatus and control the power supply to supply power to the external apparatus through the port based on a predetermined time being elapsed after the message is displayed on the display.

The display apparatus may further include the maximum power value which the power supply is capable of supplying to the backlight unit is greater than or equal to a sum of a minimum power value that is required for the backlight unit to operate and the maximum power value that is outputtable through the port.

According to another aspect of the disclosure, a method for supplying power to an external apparatus may include supplying power to an external apparatus through a port based on the external apparatus being connected to the port and reducing brightness of a display of the display apparatus based on a power supply characteristic of the port.

The method of reducing brightness of the display may further include adjusting an amount of power supplied to the display based on a maximum power value outputtable through the port and measuring an actual power consumption value of the external apparatus and readjusting the amount of power supplied to the display based on the measured actual power consumption value.

The method of readjusting the amount of power supplied to the display may further include readjusting the amount of power supplied to the display to a value obtained by subtracting the measured actual power consumption value from a sum of the adjusted power value and the maximum power value.

The method of reducing brightness of the display may further include receiving power usage information of the external apparatus through the port and adjusting the amount of power supplied to the display based on the received power usage information.

The method of reducing brightness of the display may further include displaying on the display a state that the power supply is not available based on a power consumption value of the external apparatus being greater than the maximum power value outputtable to the external apparatus through the port.

The method for supplying power to the external apparatus may further include monitoring a change in a power consumption value of the external apparatus by periodically receiving power usage information of the external apparatus through the port and adjusting the amount of power that is supplied to the display according to the change of the power consumption value.

The method of reducing the brightness of the display may further include receiving power usage information of the external apparatus by communicating with the external apparatus and adjusting the amount of power that is supplied to the display based on the received power usage information.

The method of supplying power to the external apparatus may further include displaying on the display a message to enter a power supply mode with respect to the external apparatus based on the port being connected to the external apparatus and supplying power to the external apparatus through the port based on a predetermined time being elapsed after the message is displayed on the display.

According to another aspect of the disclosure, a non-transitory computer-readable medium storing computer instructions executed by a processor of a display apparatus to perform operations may contain one or more instructions to supply power to an external apparatus through the port based on the external apparatus being connected to the port and reduce brightness of a display of the display apparatus based on a power supply characteristic of the port.

BRIEF DESCRIPTION OF THE DRAWINGS

The above and/or other aspects, and advantages of certain embodiments of the disclosure will be more apparent from the following description in conjunction with the accompanying drawings, in which:

FIG. 7 is a block diagram to illustrate a detailed configuration of the display apparatus according to various example embodiments of the disclosure;

DETAILED DESCRIPTION

Figure 1A:
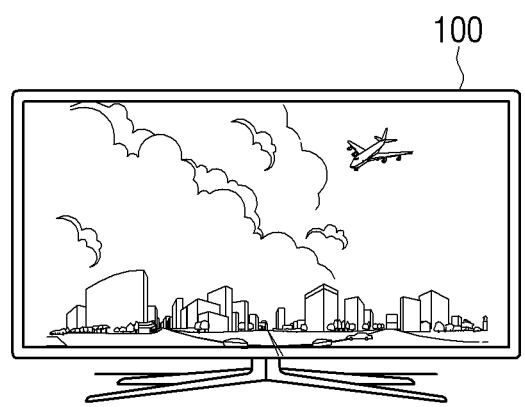
FIG. 1A is a view to illustrate an appearance of a display apparatus according to an example embodiment of the disclosure.

First of all, the terms used in the present specification and the claims are general terms identified in consideration of the functions of the various embodiments of the disclosure. However, these terms may vary depending on intention, legal or technical interpretation, emergence of new technologies, and the like of those skilled in the related art. Also, there may be some terms arbitrarily identified by an applicant. Unless there is a specific definition of a term, the term may be construed based on the overall contents and technological common sense of those skilled in the related art.

Further, like reference numerals indicate like components that perform substantially the same functions throughout the specification. For convenience of descriptions and understanding, the same reference numerals or symbols are used and described in different exemplary embodiments. In other words, although elements having the same reference numerals are all illustrated in a plurality of drawings, the plurality of drawings do not mean one exemplary embodiment.

In the disclosure, relational terms such as first and second, and the like, may be used to distinguish one entity from another entity, without necessarily implying any actual relationship or order between such entities. In embodiments of the disclosure, relational terms such as first and second, and the like, may be used to distinguish one entity from another entity, without necessarily implying any actual relationship or order between such entities.

The terms used herein are solely intended to explain a specific exemplary embodiment, and not to limit the scope of the disclosure. It is to be understood that the singular forms include plural referents unless the context clearly dictates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

Also, when any part is connected to another part, this includes a direct connection and an indirect connection through another medium. Further, when a certain portion includes a certain element, unless specified to the contrary, this means that another element may be additionally included, rather than precluding another element.

Hereinafter, the disclosure will be further described with reference to the attached drawings.

Figure 1B:
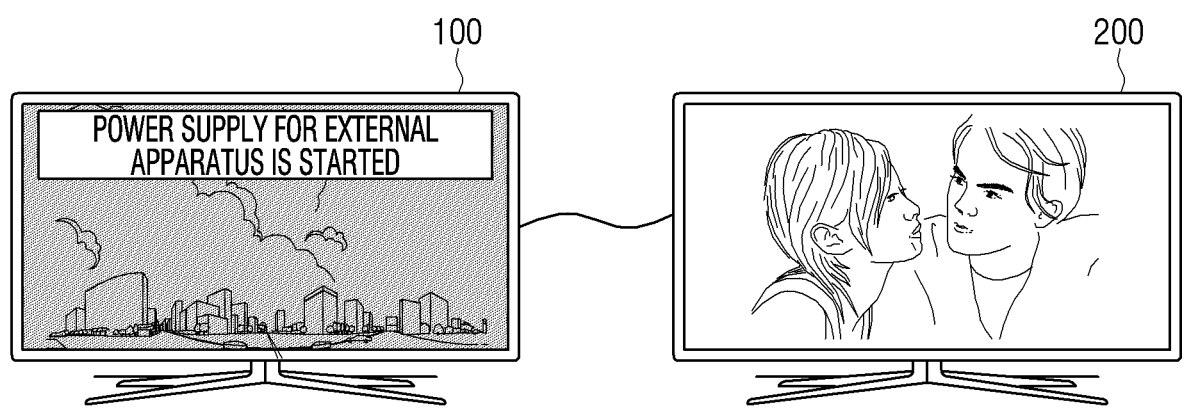
FIG. 1B is a view to illustrate an appearance of a display apparatus connected to an external apparatus according to an example embodiment of the disclosure.

FIGS. 1A and 1B are views to illustrate an appearance of a display apparatus according to an example embodiment of the disclosure.

FIG. 1A illustrates a display apparatus 100 which may be a TV or monitor and the like, displaying an image, and FIG. 1B illustrates a display apparatus 100 connected to an external apparatus 200.

As shown in FIG. 1B, when the external apparatus 200 is connected to the display apparatus 100, the display apparatus 100 may display a message such as "power supply for the external apparatus is started" and the like. FIG. 1B illustrates a situation in which the display apparatus 100 supplies power to the external apparatus 200 connected to the display apparatus 100.

Referring to FIG. 1B, the display apparatus 100 connected to the external apparatus 200 displays a darker image compared to an image of the display apparatus 100 not connected to any external apparatus as in FIG. 1A. FIG. 1B shows that the display apparatus 100 may adjust brightness of an image displayed when the power supply of the display apparatus 100 starts supplying power to the external apparatus 200.

As such, when the external apparatus 200 is connected to the display apparatus 100 and the display apparatus 100 supplies power to the external apparatus 200, the display apparatus 100 according to the disclosure may secure power to be supplied to the external apparatus 200 by reducing the amount of power supplied to the display of the display apparatus 100 in consideration of the power supply characteristics of a port connected to the external apparatus 200.

Hereinafter, various embodiments of the display apparatus 100 will be described in greater detail with respect to FIGS. 2 to 7.

Figure 2:
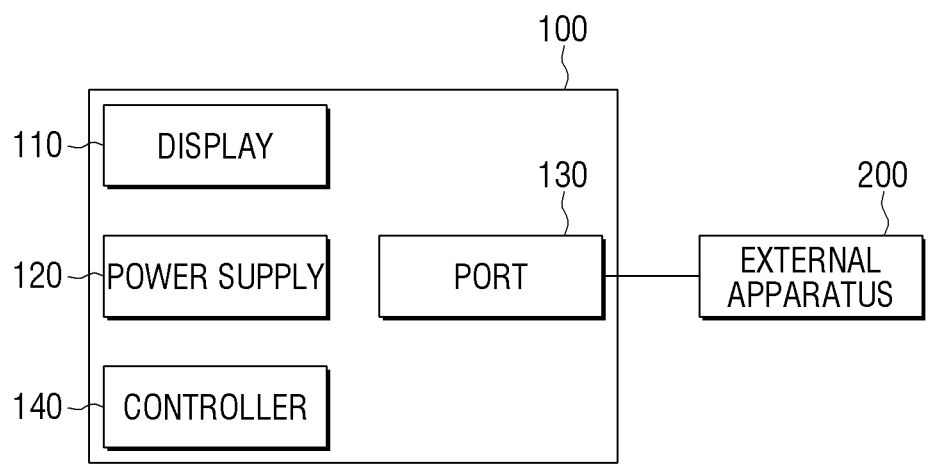
FIG. 2 is a block diagram of a display apparatus connected to the external apparatus according to an example embodiment of the disclosure.

FIG. 2 is a block diagram of the display apparatus 100 and the external apparatus 200 according to an embodiment of the disclosure.

The display apparatus 100 may be implemented as various types of devices such as a TV, a PC, a laptop PC, a tablet PC, a monitor, an electronic signboard, a kiosk, an electronic photo frame, a game player and a smartphone. The external apparatus 200 may be implemented as a TV, a PC, a monitor, or the like, or may be implemented with various electronic devices that can be electronically charged.

Referring to FIG. 2, the display apparatus 100 according to an embodiment of the disclosure includes a display 110, a power supply 120, a port 130, and a controller 140.

The display 110 may display an image based on a command of the controller 140 and the power supplied from the power supply 120. The controller 140 may include a plurality of processors to control operations of the display apparatus 100.

The display 110 may be implemented as a liquid crystal display (LCD), a light emitting diode (LED), organic light emitting diodes (OLED), and plastic OLED (POLED), and the like.

When the display 110 is implemented with the LCD display, the display 110 may include an LCD panel and a backlight unit which is positioned at a back of the LCD panel and provides light to the LCD panel.

The backlight unit can be implemented with the LED, and the backlight unit can be controlled by the LED driving board. The brightness of light which the backlight unit outputs, that is, the brightness of an image displayed on the display 110 may vary according to an amount of current supplied to the backlight unit. For example, the amount of current supplied to the backlight unit can be changed based on a control signal received from the LED driving board.

When the display 110 is implemented with panels such as the LED, OLED, and POLED, the power supply 120 may adjust power supplied to a display panel and brightness of the display 110.

The power supply 120 may supply power for each unit so that the each unit inside the display apparatus 100 can electrically operate.

The power supply 120 may receive power from the outside and supply power to the each unit of the display apparatus 100. The power supply 120 may supply electric power supplied from the outside to the each unit of the display apparatus 100 in real time, or may supply power to various units of the display apparatus 100 using a battery for charging electric power supplied from the outside.

When the external apparatus 200 is connected to the display apparatus 100 through the port 130, the power supply 120 may supply power to the external apparatus 200.

The power supply 120 may include a switching circuit which is capable of on/off operation and a DC/DC converter, and so on. The power supply 120 may be implemented as a transmitter for transmitting power wirelessly.

The port 130 is a connecting part used to connect the display apparatus 100 and the external apparatus 200. The port 130 may be implemented as a type such as a socket or a plug, and so on.

The port 130 may be a path through which various data such as images, sounds, and texts may be transmitted and received between the display apparatus 100 and the external apparatus 200. In addition, the port 130 may be a path through which power can be exchanged between the display apparatus 100 and the external apparatus 200.

To this end, the port 130 may be directly and indirectly connected to the power supply 120 and the controller 140 and the like, and when the external apparatus 200 is connected to the port 130, the power supply 120 and the controller 140, or the like can be connected to the external apparatus 200.

The port 130 may be implemented as a wired port which is designed so that power supply is possible, such as high-definition multimedia interface (HDMI) port, a display port, a red, green, blue (RGB) port, a digital visual interface (DVI) port, a universal serial bus (USB) port, thunderbolt, component port, and so on.

The port 130 may be implemented as a port for wireless communication such as Wi-Fi and Bluetooth communication. The port 130 may include a power transmitting and receiving terminal for wireless charging.

The controller 140 is configured to control the power supply 120 to supply power to each unit in the display apparatus 100 and the external apparatus 200 connected to the display apparatus 100.

The controller 140 may be implemented as a single circuit or a power board circuit along with the power supply 120. The controller 140 may include a plurality of processors configured to function as hardware or software.

When the controller 140 is implemented as hardware, the controller 140 may include a micro controller unit (MCU) capable of simple operations such as fundamental arithmetic operations.

The controller 140 may be configured to control the power supply 120 alone based on a specific input without control of other configurations.

As an example, the controller 140, when connected to the external apparatus 200 through the port 130, may receive a condition for controlling the power supply 120 from the external apparatus 200.

The controller 140 may control the power supply 120 based on an input received through the port 130 from the external apparatus 200.

According to one aspect of an example embodiment, the controller 140 of the display apparatus 100, when the external apparatus 200 is connected to the port 130, may control the power supply 120 to supply power to the external apparatus 200 through the port 130, and reduce the amount of power supplied to the display 110 based on the power supply characteristics of the port 130.

The controller 140 may be configured to identify the port 130 connected to the external apparatus 200 by, for example, connecting the controller 140 connected to the port 130 through a conducting wire with the external apparatus 200.

The power supply characteristic of the port 130 may include a maximum power value that can be output from the display apparatus 100 to the external apparatus 200 through the port 130, and a power consumption value of the external apparatus 200 supplied through the port 130, and the like. Here, the power consumption value of the external apparatus 200 may be measured by the display apparatus 100 which supplies power consumed by the external apparatus 200, or may be identified by the external apparatus 200 and transmitted to the display apparatus 100.

Specifically, the controller 140 may control the power supply 120 to adjust power supplied to the display 110 based on the maximum power value that can be output through the port 130.

By controlling the power supply 120 to reduce the value of the power supplied to the display 110 by the controller 140 based on the power supply characteristic of the port 130, the brightness of the image display 110 can be reduced. In other words, the controller 140 may control the power supply 120 to reduce the brightness of the display 110 based on the power supply characteristic of the port 130.

The display 110 may be implemented as an LCD display that includes an LCD panel and a backlight unit. If the power supply to an LCD panel board is reduced as a result of controlling the power supply 120 to supply power to the external apparatus 200, an image displayed on the display 110 can be damaged. Therefore, the controller 140 may adjust only power which is applied to the backlight unit so as to adjust only brightness of the image displayed on the display 110.

For example, when the display 110 is an LCD display including an LCD panel and a backlight unit, the controller 140 may control the power supply 120 to reduce the amount of electric current that is applied to the backlight unit included in the display 110, based on a maximum power value that can be output through the port 130.

That is, the controller 140 may control the power supply 120 to reduce the amount of power that is applied to the backlight unit or allocate the amount of power to be supplied between the backlight unit and the external apparatus 200.

For example, when the maximum power value that the power supply 120 can supply to the backlight unit is 120 watts (W) and the maximum power value that can be output from the display apparatus 100 to the external apparatus 200 through the port 130 is 100 W, the controller 140 may control the power supply 110 to supply only 20 W to the backlight unit. Here, the 20 W must be larger than the minimum power value that is required for the backlight unit to operate. The minimum power value required for the backlight unit to operate may be predetermined according to the viewing environment of the user or the attributes of the display apparatus 100.

Accordingly, the maximum power value which the power supply 120 can supply to the backlight unit can be greater than or equal to the sum of the minimum power value required to operate the backlight unit and the maximum power value that can be output from the port 130.

Specifically, as the power supplied from the power supply 120 to the LED driving board is reduced by the controller 140, the amount of the electric current applied to the backlight unit by the LED driving board can be reduced.

According to another aspect of an example embodiment of the disclosure, the controller 140 may control the power supply 120 to adjust the power supplied to the display 110 based on the maximum power value that can be output through the port 130, measure the actual power consumption value of the external apparatus 200 and control the power supply 120 to readjust the power supplied to the display 110 based on the measured actual power consumption value.

Specifically, the controller 140 may control the power supply 120 to adjust power supplied to the display 110 based on the maximum power value that can be output through the port 130. Thereafter, when the amount of power supplied to the display 110 is stabilized, the controller may control the power supply 120 to readjust the power supplied to the display 110 based on the measured actual power consumption value.

When the power supplied to the display 110 is reduced as much as the maximum power value that can be output to the external apparatus 200 through the port 130, the power supplied to the external apparatus 200 may also be reduced if the measured actual power consumption value of the external apparatus 200 is not larger than the maximum power value that can be output to the external apparatus 200. The controller 140 may be configured to readjust the power supplied from the power supply 120 to the display 110 based on the measured actual power consumption value, so that the brightness of the display 110 can be readjusted to become brighter than the case where the supply power is adjusted based on the maximum power value which can be output through the port 130.

Specifically, the controller 140 may control the power supply 120 to readjust the amount of power supplied to the display 110 to a value obtained by subtracting the measured actual power consumption value of the external apparatus 200 from the sum of the power value adjusted based on the maximum power value which can be output through the port 130 and the maximum power value which can be output through the port 130.

For example, if the maximum power value that can be supplied to the display 110, that is, the power value assigned to the display 110 is 150 W, and the maximum power value that can be output to the external apparatus 200 through the port 130 is 100 W. The controller 140 may control the power supply 120 to supply power corresponding to 50 W of 150 W to the display 110, excluding 100 W supplied to the external apparatus 200.

If the actual power consumption value of the external apparatus 200 is measured to be 80 W, the controller 140 may control the power supply 120 to supply to the display 110 power of 70 W by subtracting 80 W from the 150 W assigned to the display 110.

The display apparatus 100 may measure the actual power consumption value of the external apparatus 200 based on voltage of power and/or electric current value output to the external apparatus 200 from the power supply 120 through the port 130.

Figure 3:
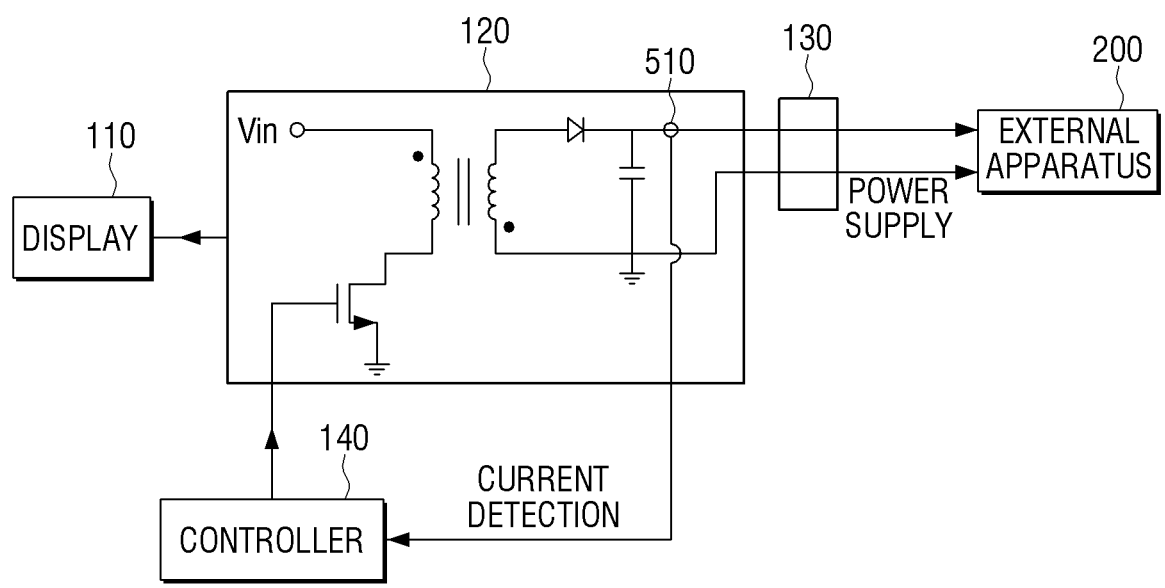
FIG. 3 is a block diagram to illustrate an example of controlling power supply based on a result of measuring power consumption of the external apparatus by the display apparatus.

FIG. 3 is a block diagram to illustrate an example of controlling power supply based on a result of measuring power consumption of an external apparatus 200 by the display apparatus 100.

Referring to FIG. 3, the power supply 120 may supply power of a specific value to the external apparatus 200 through the port 130 under the control of the controller 140. The controller 140 may calculate the power consumption value of the external apparatus 200 by receiving the value of current supplied to the external apparatus 200 through the port 130 which is measured by a current sensor 510.

In case of FIG. 3, the controller 140 may calculate the power consumption value of the external apparatus 200 by multiplying the value measured by the current sensor 510 by the amount of voltage supplied to the external apparatus 200 based on voltage Vin applied to the circuit of the power supply 120 and a characteristic of a transformer included in the circuit of the power supply 120.

However, FIG. 3 is merely exemplary and the circuit configuration of the power supply 120 and the method of measuring the power consumption value of the external apparatus 200 are not limited to the case of FIG. 3. As another example, a voltage sensor as well as the current sensor 510 may be used together, or only a voltage sensor may be used depending on the structure of the power supply 120.

Referring to FIG. 3, the controller 140 may control the power supply 120 to adjust power supplied to the display 110 based on the measured actual power consumption value of the external apparatus 200.

According to another aspect of an example embodiment, the display apparatus 100 may not measure actual power consumption value of the external apparatus 200 and receive related information from the external apparatus 200.

The controller 140 may control the power supply 120 to adjust the power supplied to the display 110 based on the maximum power value that can be output through the port 130, receive power usage information of the external apparatus 200 through the port 130, and control the power supply 120 to readjust the power supplied to the display 110 based on the received power usage information.

The power usage information of the external apparatus 200 may include connection information of the external apparatus 200 and the port 130 and power supply compatibility information of the external apparatus 200 through the port 130. The power usage information of the external apparatus 200 may include an average power consumption value of the external apparatus 200, a real time power consumption value, a minimum power consumption value for the external apparatus 200 to operate.

In one example, the maximum power value that can be supplied to the display 110 is 150 W, and the maximum power value that can be output to the external apparatus 200 through the port 130 is 100 W, and when the external apparatus 200 is connected to the port 130, the controller 140 may control the power supply 120 to supply power corresponding to 50 W of the 150 W to the display 110, excluding 100 W output to the external apparatus 200.

If the power consumption value of the external apparatus 200 is included in the power usage information of the external apparatus 200 received from the external apparatus 200 and the power consumption value of the external apparatus 200 is 80 W, the controller 140 may control the power supply 120 to supply 70 W to the display 110, which is obtained by subtracting 80 W from 150 W allocated to the display 110.

The controller 140 may receive the power usage information of the external apparatus 200 from the external apparatus 200 based on Inter-Integrated Circuit (I2C) communication through the port 130. To this end, the port 130 may include a serial data (SDA) wire and a serial clock (SCL) wire.

Figure 4:
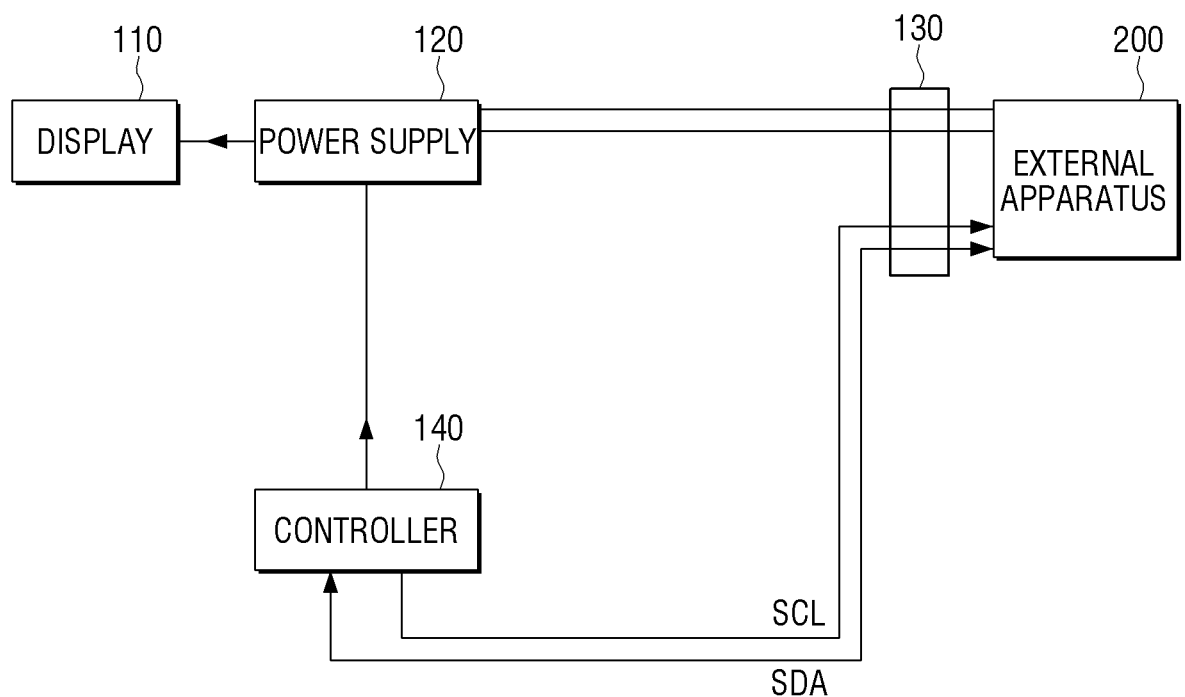
FIG. 4 is a block diagram to illustrate an example of controlling power supply based on a result of receiving power consumption value from the external apparatus by the display apparatus.

FIG. 4 is a block diagram to illustrate an example of receiving power consumption value of the external apparatus 200 from the external apparatus 200 by the display apparatus 100 using I2C communication.

Referring to FIG. 4, the controller 140 may be connected to the port 130 and the external apparatus 200 through the SDA wire and the SCL wire for I2C communication and receive power usage information from the external apparatus 200.

In another aspect of an example embodiment, the controller 140 may receive power usage information of the external apparatus 200 from the external apparatus 200 on the basis of serial peripheral interface (SPI) communication through the port 130. In this case, the port 130 may include a plurality of wires to transmit a logic signal such as a serial clock, a master output and a slave input, a master input and a slave output, and a slave select.

In order to receive information on power consumption value of the external apparatus 200 and the connection information of the external apparatus 200 and the port 130 from among the power usage information, the controller 140 may use a simple wire capable of transmitting a binary signal. In addition, the port 130 may include one or more wires capable of transmitting a binary signal.

Figure 5:
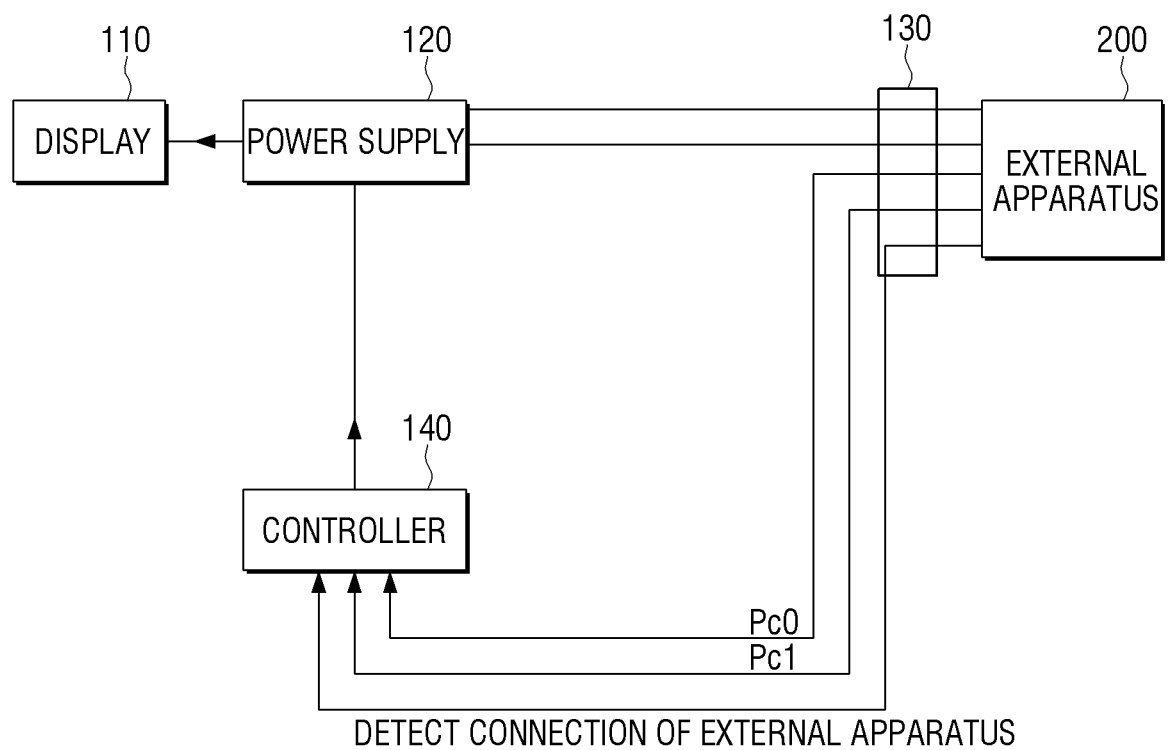
FIG. 5 is a block diagram to illustrate an example of controlling power supply based on a result of receiving power consumption value from the external apparatus by the display apparatus.

As an example, referring to FIG. 5, the controller 140 may be connected to the port 130 and the external apparatus 200 through three wires capable of transmitting at least two signals.

Referring to FIG. 5, one of the three wires corresponds to a wire to detect connection of the external apparatus 200 and the other two wires correspond to Pc0 and Pc1.

As an example of detecting whether the external apparatus 200 is connected to the port 130 through a connection detecting wire of the external apparatus 200, it can be set in the external apparatus 200 and the controller 140 that, if a signal of the connection detecting wire which is input from the external apparatus 200 is low, the external apparatus 200 and the port 130 are not connected to each other, and if the connection detecting wire which is input from the external apparatus 200 is high, the external apparatus 200 and the port 130 are connected.

Two wires which correspond to Pc0 and Pc1 are for transmitting the power consumption value (Pc) of the external apparatus 200 and may be configured to transmit a low or high signal.

For example, it can be set in the external apparatus 200 and the controller 140 that, when (Pc0, Pc1) is (low, low), the power consumption value (Pc) is 25 W; when (Pc0, Pc1) is (low, high), the power consumption value (Pc) is 50 W; when (Pc0, Pc1) is (high, low), the power consumption value (Pc) is 75 W; and when (Pc0, Pc1) is (high, high), the power consumption value (Pc) is 100 W.

Accordingly, the frequency of the process for re-adjusting the power supplied to the display 110 based on the power usage information received from the external apparatus 200 can be reduced, and the brightness of the display 110 can also be reduced accordingly to reduce power consumption of the display 110. In addition, because only three wires capable of transmitting a binary signal are used, it is very economical compared to other embodiments in which more than three wires are used.

If the port 130 is implemented as a port for wireless communication such as Wi-Fi or Bluetooth communication, the controller 140 may use the power usage information of the external apparatus 200 received through the wireless communication using the port 130 and control the power supply 120 to readjust the power supplied to the display 110.

The controller 140 periodically receives the power usage information of the external apparatus 200 through the port 130 to monitor a change in the power consumption value of the external apparatus 200, and control the power supply 120 to readjust the power supplied to the display 110 step by step in accordance with the change of the monitored value.

For example, if the maximum power value that can be supplied to the display 110 is 150 W and the maximum power value that can be output through the port 130 is 100 W, the controller 140 may control the power supply 120 to supply power, to the display 110, corresponding to 50 W which excludes 100 W allocated to the external apparatus 200 through the port 130 from 150 W, when the external apparatus 200 is connected to the port 130.

Here, the power consumption value of the external apparatus 200 is included in the power usage information of the external apparatus 200 and is periodically received from the external apparatus 200. The power consumption value of the external apparatus 200 which is periodically monitored may be, for example, 90, 80, 70, or 60 W. In accordance with the periodically monitored power consumption values, the controller 140 may control the power supply 120 to supply, to the display 110, power corresponding to 60, 70, 80, and 90 W by subtracting 90, 80, 70, and 60 W from 150 W allocated to the display 110 step by step.

In another aspect of an example embodiment, the change in power consumption value of the external apparatus 200 may occur due to any change in function performed by the external apparatus 200 or any additional device connected to the display apparatus 100.

When the power supply environment is changed due to the change of the power consumption value of the external apparatus 200, the controller 140 may directly or indirectly control the display 110 to display the power supply environment change message indicating that the power supply environment has changed.

Specifically, a plurality of processors included in the controller 140 receives information or a signal indicating that the power consumption value of the external apparatus 200 has changed. Accordingly, the display 110 may display a message indicating the change in the power consumption value of the external apparatus 200 and the change in power supply based on a specific signal or a command received from the controller 140 by a separate wire or software.

A plurality of processors included in the controller 140 as hardware or software may receive power usage information of the external apparatus 200 from the external apparatus 200 and control the display 110 to display a power supply environment change message.

If the power consumption value of the external apparatus 200 is greater than the maximum power value that can be supplied to the external apparatus 200 through the port 130, the controller 140 may control the power supply 120 not to supply power to the external apparatus 200 through the port 130 and control the display 110 to display a state that the power supply is disabled.

As an example, if the power consumption value of the external apparatus 200 received from the external apparatus 200 is 150 W, but the maximum power value which can be supplied to the external apparatus 200 is only 100 W, the display apparatus 100 may not supply sufficient power to the external apparatus 200 and may not supply electric power to the external apparatus 200.

When power is not supplied to the external apparatus 200, the controller 140 may turn off the power supply circuit included in the power supply 120 connected to the external apparatus 200, or change to a standby state in which only low power can be output.

In this case, the controller 140 does not control the power supply 120 to adjust the power supplied to the display 110 or at least the controller 140 does not control the power supply 120 differently when the external apparatus 200 was not connected to the port 130.

Figure 6A:
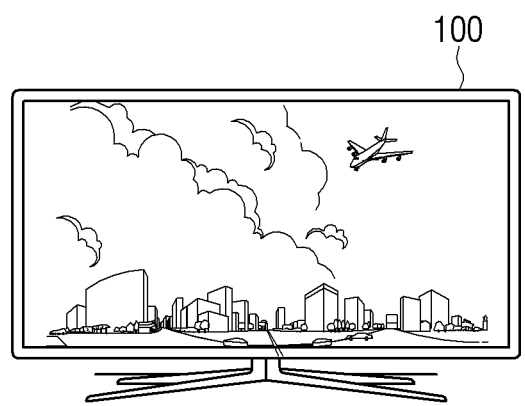
FIG. 6A is a view to illustrate an example of the display apparatus not supplying power to the external apparatus in a case when the power consumption value of the external apparatus is greater than the power supply characteristic of the port.
Figure 6B:
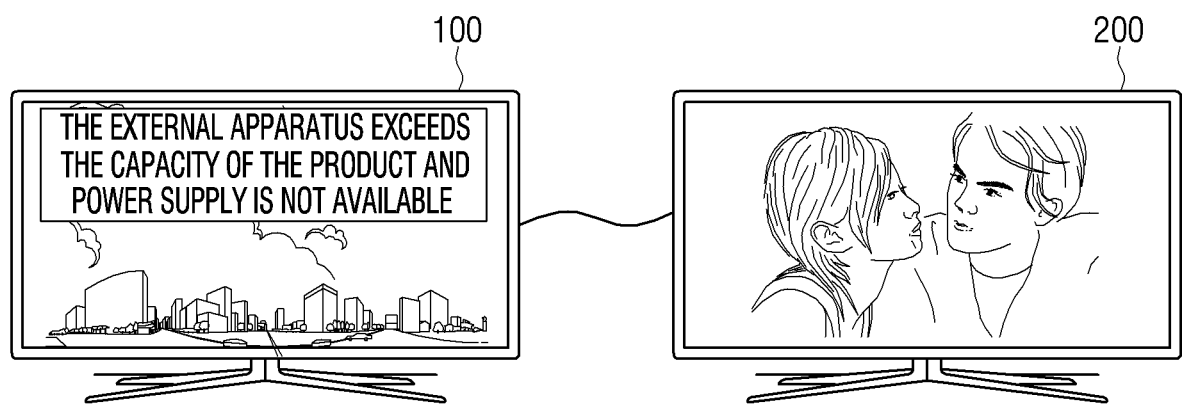
FIG. 6B is a view to illustrate an example of the display apparatus displaying a message not to supply power to the external apparatus in the case when the power consumption value of the external apparatus is greater than the power supply characteristic of the port.

FIGS. 6A and 6B are views to illustrate an example of a case where a power consumption value of the external apparatus 200 is greater than the maximum power value that can be supplied to the external apparatus 200 through the port 130.

FIG. 6A illustrates a state before the external apparatus 200 is connected to the display apparatus 100, and FIG. 6B illustrates a state where the external apparatus 200 is connected to the display apparatus 100.

Referring to FIG. 6B, although the external apparatus 200 is connected to the display apparatus 100, the display 110 may display a message "the external apparatus exceeds the capacity of the product and power supply is not available."

Also, it can be seen that there is no difference between the image brightness displayed in FIG. 6A and the image brightness displayed in FIG. 6B since in FIG. 6B, the controller 140 does not control the power supply 120 to adjust the power supplied to the display 110 differently from when the external apparatus 200 was not connected to the display apparatus 100 as in FIG. 6A.

That is, the controller 140 may control the power supply 120 not to perform an operation to supply power to the external apparatus 200 and an operation to adjust the amount of power supplied to the display 110.

The message "the external apparatus exceeds the capacity of the product and power supply is not available" may be displayed on the display 110 based on direct or indirect control of the controller 140.

Specifically, the plurality of processors which receives information or a signal indicating that the power consumption value of the external apparatus 200 is greater than the maximum power value that can be supplied to the external apparatus 200 through the port 130 may control the display 110 and display the above message. Alternatively, the controller 140 and the display 110 may be connected by a separate wire or communicate to each other by software, and the display 110 which receives a specific signal or a command of the controller 140 may display the above message.

The plurality of processors included in the controller 140 as hardware or software may receive power usage information of the external apparatus 200 from the external apparatus 200 and control the display 110 to display the above message.

When the port 130 is connected to the external apparatus 200, the controller 140 may control the display 110 to display a message to enter the power supply mode with respect to the external apparatus 200, and when a predetermined time is elapsed after the message is displayed on the display 110, the controller 140 may control the power supply 120 to supply power to the external apparatus 200 through the port 130.

The controller 140 may control the display 110 to display a message to enter the power supply mode regarding the external apparatus 200, and control the power supply 120 to supply power to the external apparatus 200 through the port 130 only when a user input allows the power supply 120 to enter the power supply mode.

FIG. 7 is a block diagram to illustrate a detailed configuration of the display apparatus 100 according to various embodiments of the disclosure.

Referring to FIG. 7, the display apparatus 100 may include at least one of the display 110, the power supply 120, the port 130, the controller 140, and at least one of the processor 150, a communicator 160, an inputter 170, a user inputter 180, an audio outputter 190 and a storage 195.

The processor 150 may control overall operations of the display apparatus 100.

The processor 150 may include a Random Access Memory (RAM), a Read Only Memory (ROM), a central processing unit (CPU), a graphic processing unit (GPU), and a system bus, and the like, and can perform operations or data processing on the control of other components included in the display apparatus 100.

The processor 150, based on a signal or data received from the controller 140, may control the display 110 to display a message that the power supply is disabled or a message to enter the power supply mode with respect to the external apparatus 200.

FIG. 7 illustrates that the processor 150 is configured separately from the controller 140 and operates in association with each other, but it is not limited thereto. The processor 150 may be configured as one unit which includes a computer instruction that corresponds to the controller 140 as software or includes a circuit that corresponds to the controller 140 as hardware.

That is, the processor 150 may include the controller 140 and directly perform all the operations which are described as being performed by the controller 140 in the disclosure.

The communicator 160 may communicate with various types of external apparatuses according to various communication methods. The display apparatus 100 may transmit or receive data by wire or wirelessly with the external apparatus 200 through the communicator 160.

The controller 140 may receive power usage information of the external apparatus 200 through the communicator 160. Alternatively, the controller 140, through the processor 150, may receive the power usage information of the external apparatus 200 received through the communicator 160.

The controller 140 may control the power supply 120 to adjust power supplied to the display 110 based on the maximum power value that is outputtable from the port 130 and then control the power supply 120 to readjust power supplied to the display 110 based on the received power usage information.

The inputter 170 may receive an image and an audio signal corresponding to a broadcast signal from a broadcasting station or an external server. The inputter can be implemented with a tuner.

The image received through the inputter 170 may be output through the display 110 and a voice received through the inputter 170 may be output through an audio outputter 190.

The user inputter 180 receives various user commands. The processor 150 and the controller 140 may perform a function corresponding to a user command which is input through the user inputter 180.

For example, when the external apparatus 200 is connected to the port 130, the user inputter 180 may receive a user's selection regarding whether to enter the power supply mode to supply power to the external apparatus 200.

The user inputter 180 may include a microphone to receive a user command in a voice format, may be implemented as a touch screen to receive a user command on the display 110, or may be implemented as a separate touch pad.

The user inputter 180 may receive a signal including a user command from a remote control device to control the display apparatus 100.

The audio outputter 190 may output a voice signal included in a signal which is input through the port 130, the inputter 170, or the communicator 160 or output a specific voice included in the memory according to control of the processor 150.

The audio outputter 190 may output a voice corresponding to information such as power supply disabled, power supply mode entered, power supply environment change with respect to the external apparatus 200 according to a control of the processor 150 and/or the controller 140.

For example, as a result of connection with the controller 140, the audio outputter 190 may output a voice corresponding to information such as power supply disabled, power supply mode entered, power supply environment change with respect to the external apparatus 200 according to a control of the controller 140.

Further, the audio outputter 190 may include a speaker and a headphone/earphone output terminal.

The storage 195 may store instructions or data related to the operating system (OS) to control overall operations of the elements of the display apparatus 100.

Further, the storage 195 may be implemented as non-volatile memory (i.e., hard disk, solid state drive (SSD), flash memory, volatile memory, and etc.).

The storage 195 may store message information that can be visually or audibly output through the display 110 or the audio outputter 190 to correspond to each case, for example, in which power supply to the external apparatus 200 is started, a power supply environment regarding the external apparatus 200 is changed, the external apparatus 200 is connected, but power supply is disabled.

The storage 195 may store information on the power supply characteristics of the port 130, such as the maximum value of the power that the port 130 can output. In addition, the storage 195 may store a minimum value of the power required for the backlight unit included in the display 110 to operate.

Figure 8:
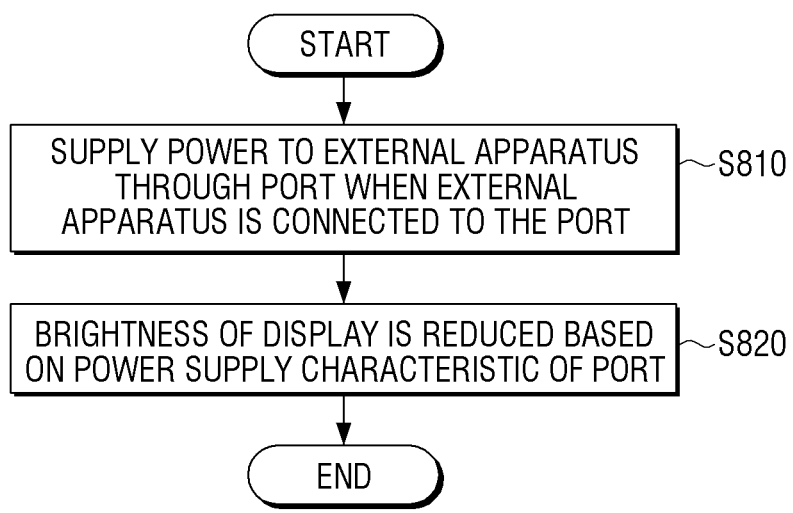
FIG. 8 is a flowchart to illustrate a method for supplying power to the external apparatus and reducing the brightness of the display according to an example embodiment of the disclosure.

FIG. 8 is a flowchart to describe a method for supplying power to the external apparatus and reducing the brightness of the display according to an example embodiment of the disclosure.

Referring to FIG. 8, a power supply method of a display apparatus may include supplying power to an external apparatus through a port when the external apparatus is connected to the port in operation S810. Here, the port does not only supply power to the external apparatus connected to the port, but also function as a port for transmitting and receiving various data such as images and voices.

Also, when the external apparatus is connected to the port, a message indicating that the power supply mode will be entered is to be displayed on a display. After a predetermined time has elapsed after the message is displayed on the display, power can be supplied to the external apparatus through the port.

Alternatively, when the external apparatus is connected to the port, a message asking whether to enter the power supply mode for the external apparatus is displayed on the display, and an input that allows the user to enter the power supply mode is input to the external apparatus, and power may be supplied to the external apparatus through the port.

The brightness of a display of the display apparatus can be reduced based on the power supply characteristics of the port in operation S820.

The power supply characteristic of the port may include a maximum power value outputtable from the display apparatus to the external apparatus through the port and a power consumption value of the external apparatus. The power consumption value of the external apparatus may be measured by the display apparatus that supplies power to the external apparatus, or may be identified by the external apparatus and transmitted to the display apparatus.

The brightness of the display can be controlled by adjusting the amount of power supplied to the display. The brightness of the display can be reduced by adjusting the amount of power supplied to the display based on the maximum power value output from the port and then readjusting the power supplied to the display based on the measured actual power consumption value.

Figure 9:
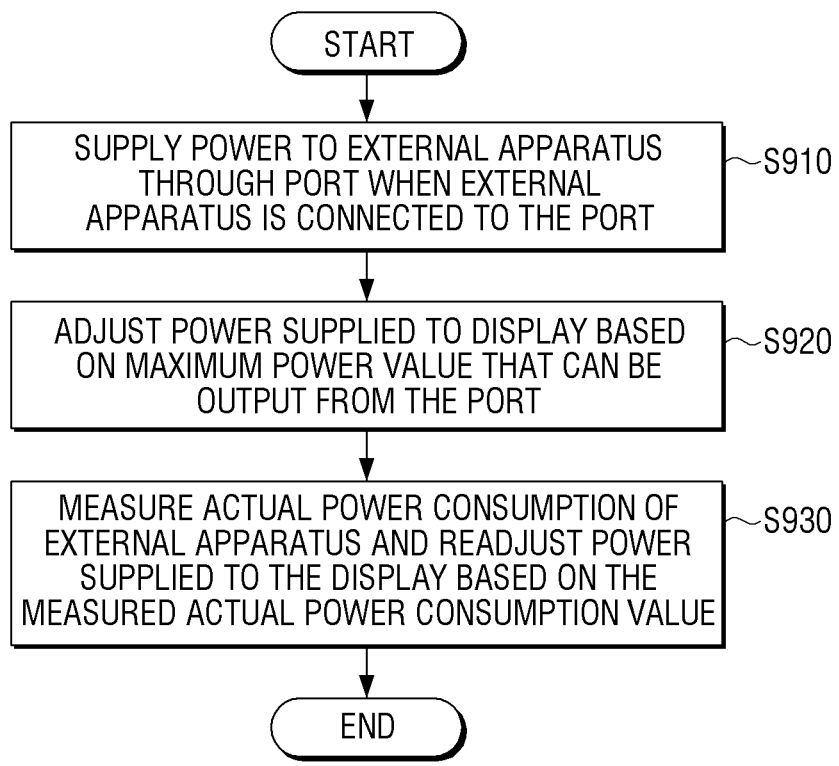
FIG. 9 is a flowchart to illustrate a power supply method to control the power supply based on a result of measuring power consumption of the external apparatus.

FIG. 9 is a flowchart to describe a method for reducing the brightness of the display after the external apparatus is connected to the port based on the measured actual power consumption value.

Referring to FIG. 9, when the external apparatus is connected to the port, power can be supplied to the external apparatus through the port in operation S910.

Then, the power to be supplied to the display can be adjusted based on the maximum power value output from the port in operation S920. Specifically, the amount of power to be supplied to the display can be adjusted by subtracting the maximum power value outputtable from the port from the maximum power value that can be supplied to the display.

For example, if the display is an LCD display including an LCD panel and a backlight unit, the controller may adjust the amount of power supplied to the backlight unit of the display based on the maximum power value output from the port. That is, the amount of power supplied to the backlight unit can be adjusted by subtracting the maximum power value that can be output from the port from the maximum power value that can be supplied to the backlight unit of the display.

Adjusting the amount of power to be supplied to the backlight unit may be performed by adjusting the amount of current supplied to the backlight unit.

Thereafter, the actual power consumption value of the external apparatus may be measured and the amount of power supplied to the display may be readjusted in operation S930 based on the measured actual power consumption value. At this time, it is possible to use the current sensor and/or the voltage sensor included in the display apparatus to measure the actual power consumption value of the external apparatus.

Readjusting the amount of power supplied to the display may be performed by readjusting the amount of the power supplied to the display as a value obtained by subtracting the actual power consumption value measured from the sum of the adjusted power value and the maximum power value output from the port.

For example, if the display is an LCD display including an LCD panel and a backlight unit, the controller may readjust the amount of current supplied to the backlight unit of the display based on the measured actual power consumption value. That is, the amount of power supplied to the backlight unit can be adjusted by subtracting the measured actual power consumption value from the maximum power value that can be supplied to the backlight unit of the display.

Another example of reducing the brightness of the display is by adjusting the amount of power supplied to the display based on the received power usage information after receiving the power usage information of the external apparatus through the port. The power usage information of the external apparatus may be received from the external apparatus.

The power usage information of the external apparatus may include connection information of the external apparatus and the port, and power supply compatibility information of the external apparatus through the port. The power usage information of the external apparatus may include an average power consumption value of the external apparatus, a real time power consumption value, a minimum power consumption value for operating the external apparatus, and the like.

If the power consumption value of the external apparatus included in the received power usage information is greater than the maximum power value that can be supplied to the external apparatus through the port, the power may not be supplied to the external apparatus through the port. In this case, the display may indicate that the power supply is not available.

Figure 10:
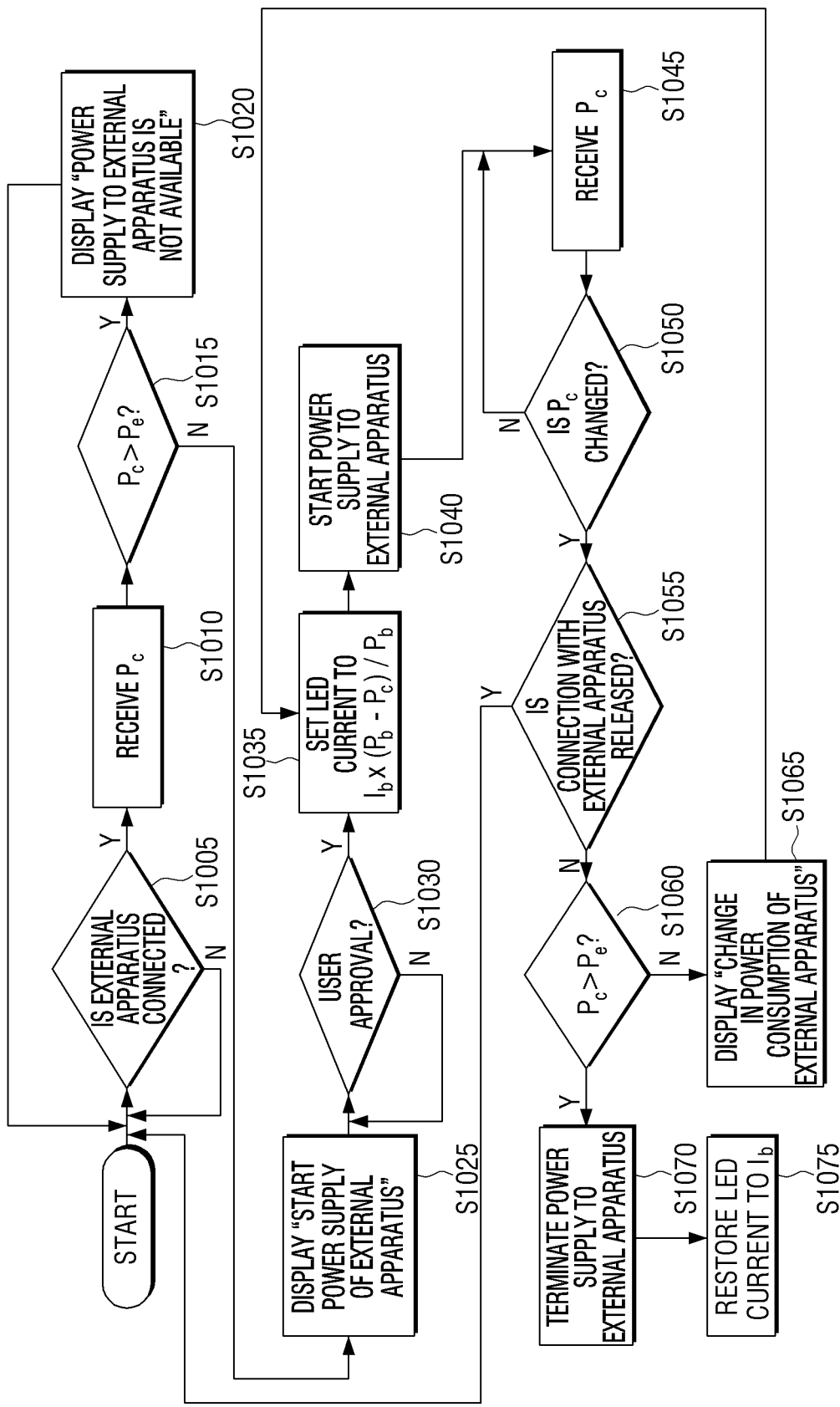
FIG. 10 is a detailed algorithm to schematically illustrate a method of supplying power of the display apparatus as a detailed example according to the disclosure.

FIG. 10 illustrates the aforementioned example, that is, an example of detailed algorithm in a case where the amount of power supplied to the display is adjusted based on the received power usage information of the external apparatus.

Referring to FIG. 10, it is determined whether the external apparatus is connected to the port in operation S1005. If the external apparatus is connected to the port in operation S1005-Y, the power consumption value (Pc) of the external apparatus is received from the external apparatus in operation S1010.

It is determined whether the power consumption value Pc of the received external apparatus is greater than the maximum power value Pe outputtable to the external apparatus through the port in operation S1015. If the power consumption value Pc of the external apparatus is greater than the maximum power value Pe outputtable to the external apparatus through the port in operation S1015-Y, a message indicating that power supply to the external apparatus is not available is displayed on the display in operation S1020.

If the power consumption value Pc of the external apparatus is not greater than the maximum power value Pe that can be output to the external apparatus through the port in operation S1015-N, a message indicating that power supply to the external apparatus is started is displayed on the display in operation S1025.

Thereafter, when receiving a user input that power can be supplied to the external apparatus in operation S1030-Y, it is necessary to lower the power supplied to the display at the same time or immediately before when the power supply to the external apparatus is started. If the display includes a backlight unit and an LCD panel, the power supplied to the display can be adjusted by adjusting the LED current of the backlight unit.

That is, when receiving a user input that power supply to the external apparatus is allowed in operation S1030-Y, the LED current value of the backlight unit may be adjusted by adjusting the maximum value Ib of the LED current of the backlight unit at a constant ratio. The maximum value Ib of the LED current may correspond to the power value assigned to the backlight unit, i.e., the maximum value Pb of the power that can be supplied to the backlight unit.

Referring to FIG. 10, when the user input that power can be supplied to the external apparatus is received in operation S1030-Y, the LED current value of the backlight unit can be set to the value of "Ib*(Pb−Pc)/Pb" in operation S1035. Simultaneously or immediately thereafter, power supply to the external apparatus is started in operation S1040.

Then, the power consumption value Pc of the external apparatus is received until the power consumption value of the external apparatus is changed in operation S1050-Y. If the power consumption value of the external apparatus is changed in operation S1050-Y, it is first determined whether the connection to the port of the external apparatus is released in operation S1055. If the connection is released in operation S1055-Y, the process returns to operation S1005 to determine whether the external apparatus is connected to the port.

If the connection is not released in operation S1055-N, it is determined whether the power consumption value Pc of the received external apparatus is greater than the maximum power value Pe outputtable to the external apparatus through the port in operation S1060. If the power consumption value Pc of the external apparatus is greater than the maximum power value Pe outputtable to the external apparatus through the port in operation S1060-Y, the power supply to the external apparatus is terminated in operation S1070, and the LED current of the backlight unit can be restored to Ib in operation S1075.

If the power consumption value Pc of the external apparatus is not greater than the maximum power value Pe outputtable to the external apparatus through the port in operation S1015-N, a message indicating that the power consumption of the external apparatus has changed is displayed on the display in operation S1065.

Simultaneously or immediately thereafter, the LED current value of the backlight unit can be newly set to a value of "Ib*(Pb−Pc)/Pb" based on the power consumption value Pc of the external apparatus that has changed in operation 1035. Accordingly, the power value to be supplied to the external apparatus and the amount of power to be supplied to the display may change and this corresponds to a case in which the power supply environment for the external apparatus is changed, for example, another external apparatus is connected to the external apparatus or a function performed by the external apparatus has changed.

Reducing the brightness of the display is performed by periodically receiving power usage information of the external apparatus through the port and monitoring the change of the power consumption value of the external apparatus, and supplying the power to the display according to the change of the power consumption value in a step-by-step manner.

Alternatively, reducing the brightness of the display may be performed by communicating with an external apparatus to receive power usage information of the external apparatus and to adjust power supplied to the display based on the received power usage information.

The power supply method described with reference to FIGS. 8 to 10 can be performed in a display apparatus having the configuration shown and described in FIG. 2 and FIG. 7, but is not limited thereto. For example, in the various kinds of electronic apparatuses in which the program for performing the power supply method described in FIGS. 8 to 10 is installed, power may be supplied to the external apparatus and the power supplied to the display may be adjusted as described above.

The various embodiments described above include software and hardware) or a combination thereof; and a recording medium which can be read from a computer or a similar device using the combination thereof.

According to a hardware implementation, the embodiments described in this disclosure may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and an electric unit for performing other functions.

In some cases, the embodiments described herein may be implemented as a processor. According to a software implementation, embodiments, such as the procedures and functions described herein, can be implemented as separate software modules. Each of the software modules described above can perform one or more functions and operations described herein.

Meanwhile, the computer instructions for performing the processing operations in the display apparatus 100 according to the various embodiments of the disclosure described above may be stored in a non-transitory computer-readable medium. The computer instructions stored in this non-transitory computer-readable medium cause the above-described specific device to perform the processing operations in the electronic apparatus 100 according to the above-described various embodiments when executed by the processor of the specific device.

Non-volatile computer readable medium means a medium that stores data for a short period of time such as a register, a cache, a memory, etc., but semi-permanently stores data and can be read by a device. Specific examples of non-volatile computer readable media include compact disc (CD), digital versatile disc (DVD), hard disk, Blu-ray disk, universal serial bus (USB), memory card, read only memory (ROM), etc.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A display apparatus comprising:
   a display;
   a power supply configured to supply power to the display;
   a port; and
   a controller configured to, based on an external apparatus being connected to the port:
   control the power supply to supply power to the external apparatus through the port;
   control the power supply to adjust an amount of power supplied to the display based on a maximum power value outputtable through the port;
   measure an actual power consumption value of the external apparatus; and
   control the power supply to readjust the amount of power supplied to the display based on the measured actual power consumption value of the external apparatus.

2. The display apparatus of claim 1, wherein the controller is further configured to control the power supply to reduce an amount of current that is applied to a backlight unit in the display based on a first maximum power value that is outputtable through the port.

3. The display apparatus of claim 2, wherein a second the maximum power value which the power supply is capable of supplying to the backlight unit is greater than or equal to a sum of a minimum power value that is required for the backlight unit to operate and the maximum power value that is outputtable through the port.

4. The display apparatus of claim 1, wherein the controller is further configured to control the power supply to readjust the amount of power supplied to the display to a value obtained by subtracting the measured actual power consumption value from a sum of the adjusted power value and the maximum power value.

5. The display apparatus of claim 1, wherein a received power usage information comprises a power consumption value of the external apparatus, and
wherein the controller is further configured to, based on a power consumption value of the external apparatus being greater than the maximum power value outputtable to the external apparatus through the port, control the power supply not to supply power to the external apparatus through the port and indicate that the power supply is not available.

6. The display apparatus of claim 1, wherein the controller is further configured to:
monitor change in a power consumption value of the external apparatus by periodically receiving a power usage information of the external apparatus through the port, and
control the power supply to readjust the amount of power that is supplied to the display according to the change of the power consumption value.

7. The display apparatus of claim 1, further comprising: a communicator,
wherein the controller is further configured to receive power usage information of the external apparatus through the communicator and control the power supply to readjust the amount of power that is supplied to the display based on the received power usage information.

8. The display apparatus of claim 1, wherein the controller is further configured to, based on the port being connected to the external apparatus:
control the display to display a message to enter a power supply mode with respect to the external apparatus, and
control the power supply to supply power to the external apparatus through the port based on a predetermined time being elapsed after the message is displayed on the display.

9. A method for supplying power to an external apparatus, the method comprising:
supplying power to the external apparatus through a port based on the external apparatus being connected to the port;
adjusting an amount of power supplied to a display of a display apparatus based on a maximum power value outputtable through the port;
measuring an actual power consumption value of the external apparatus; and
readjusting the amount of power supplied to the display based on the measured actual power consumption value.

10. The method of claim 9, wherein the readjusting the amount of power supplied to the display comprises readjusting the amount of power supplied to the display to a value obtained by subtracting the measured actual power consumption value from a sum of the adjusted power value and the maximum power value.

11. The method of claim 9, further comprising:
displaying on the display a state that the power supply is not available based on a power consumption value of the external apparatus being greater than the maximum power value outputtable to the external apparatus through the port.

12. The method of claim 9, wherein the measuring comprises:
monitoring a change in a power consumption value of the external apparatus by periodically receiving power usage information of the external apparatus through the port; and
wherein the readjusting comprises:
adjusting the amount of power that is supplied to the display according to the change of the power consumption value.

13. The method of claim 9, wherein the measuring comprises:
receiving power usage information of the external apparatus by communicating with the external apparatus; and
wherein the readjusting comprises:
adjusting the amount of power that is supplied to the display based on the received power usage information.

14. The method of claim 9, wherein the supplying power to the external apparatus comprises:
displaying on the display a message to enter a power supply mode with respect to the external apparatus based on the port being connected to the external apparatus; and
supplying power to the external apparatus through the port based on a predetermined time being elapsed after the message is displayed on the display.

15. A non-transitory computer-readable medium storing computer instructions executed by a processor of a display apparatus to perform operations comprising:
supplying power to an external apparatus through a port based on the external apparatus being connected to the port;
adjusting an amount of power supplied to a display of a display apparatus based on a maximum power value outputtable through the port;
measuring an actual power consumption value of the external apparatus; and
readjusting the amount of power supplied to the display based on the measured actual power consumption value.

* * * * *